United States Patent [19]
Sonoyama et al.

[11] Patent Number: 5,539,819
[45] Date of Patent: Jul. 23, 1996

[54] CREDIT CARD WHICH GENERATES A DTMF TONE

[75] Inventors: Yukio Sonoyama; Masahiro Koura, both of Tokyo, Japan

[73] Assignee: Bell Systems 24 Inc., Japan

[21] Appl. No.: 543,154

[22] Filed: Oct. 13, 1995

Related U.S. Application Data

[63] Continuation of Ser. No. 224,737, Apr. 8, 1994, abandoned.

[30] Foreign Application Priority Data

Jul. 19, 1993 [JP] Japan .................................... 5-177922

[51] Int. Cl.⁶ .................................................. H04M 1/26
[52] U.S. Cl. ........................... 379/355; 379/354; 379/357; 379/413
[58] Field of Search .................................. 379/355, 354, 379/356, 357, 412, 413

[56] References Cited

U.S. PATENT DOCUMENTS 4,817,135  3/1989  Winebaum ............................. 379/355
4,868,849  9/1989  Tamaoki ................................. 379/357
4,980,910  12/1990 Oba et al. .............................. 379/355
4,995,077  2/1991  Malinowski ........................... 379/355
5,181,744  1/1993  Betheil .................................... 379/354
5,343,519  8/1994  Feldman ................................. 379/354

Primary Examiner—Jeffery Hofsass
Assistant Examiner—Jacques M. Saint-Surin
Attorney, Agent, or Firm—Hoffman, Wasson & Gitler

[57] ABSTRACT

A credit card capable of automatic dialing by generating DTMF signals. The credit card is comprised of two thin plastic boards 2 and 3 adhering to each other. The plastic board 2 includes a magnetic stripe 11, while the plastic board 3 includes a solar power battery 21, paper speaker (SP) 22, dial selection key 23 and a circuit board 25. When the dial selection key 23 is pressed, the DTMF signals are generated based on the corresponding telephone number, and outputted from the SP 22. Desired telephone numbers inputted by a user can be stored by using EEPROM 102, four buttons 101 and dial selection buttons 23.

5 Claims, 8 Drawing Sheets

CREDIT CARD WHICH GENERATES A DTMF TONE

This application is a continuation of application Ser. No. 08/244,737 filed on Apr. 8, 1994 now abandoned.

BACKGROUND OF THE INVENTION

The present invention relates to a credit card and, more particularly to a credit card having a touch-tone signal generation function.

Conventional credit cards have a little difference in their designs, but have a similar structure such that a card number and the card holder's name are embossed on a plastic card in the size of business card, and a magnetic tape storing a secret number of the card holder and other information is attached to one side of the card.

Information on the magnetic tape of a credit card is read by a card reader of POS (Purchase & Ordering System) terminals or bank's ATM (Automatic Teller Machine), and the read information is used for transactions such as payment approval, and cashing or loan.

Along with recent increase of the number of overseas travelers, most credit cards are available abroad as "international cards" by commercial tie-up among credit companies, and their usefulness has increased.

Services offered by those credit card companies, however, have few differences, and it cannot be said that one credit card is considerably better than another. Furthermore, one credit card cannot be privilegedly discriminated from the other, since both cards are commonly available over many shops.

A service most recently offered by the credit card companies is a system where a credit card holder can use his/her card to make an international phone call from a public telephone and pay the bill through the credit card account. Accordingly, the card holder do not have to pay for rather expensive international call in cash, thus being advantageous for travelers not to carry a large amount of cash.

Furthermore, the telephone companies offer a service where a user can enjoy assistance from his/her own language-speaking telephone operator (e.g. a Japanese-speaking telephone operator) by dialing a particular number, when the user makes an international call from the abroad.

However, even though the payment can be made by the credit card, or the operation service in his/her own language-speaking (e.g. Japanese) is offered, a particular telephone number needs to be called without errors in a visiting country to receive those services. Thus, it is still difficult for most of travelers to make an international call from the visiting country. From the point of view of a traveler, making a phone call from abroad is still troublesome.

Considering this situation, development of this current system to make an international call by using a credit card is desirable. At the same time, from the point of view as a credit card issuer, it is desired to provide a credit card which is advantageously distinguishable from other cards.

SUMMARY OF THE INVENTION

Accordingly, it is an object of the present invention to provide a credit card having a dial-tone signal generation function.

According to the present invention, the foregoing object is attained by A credit card made of a thin plastic board comprising: a magnetic stripe for storing information concerning the credit card; storage means for storing a telephone number; instruction means for instructing to transmit a DTMF signal based on the telephone number stored in the storage means; signal generation means for generating a DTMF signal based on the instruction from the instruction means; sound generation means for generating a sound based on the DTMF signal; and long-life power supply means for supplying a power for a long time at least to the storage means and the signal generation means, wherein the magnetic stripe is provided on one side of the plastic board, the instruction means and sound generation means are provided in the other side, the storage means and signal generation means are embedded in the plastic card, and the long-life power supply means supplies the power at least during the effective period of the credit card.

In accordance with the present invention as described above, DTMF signal based on a telephone number stored in storage means is generated by the instruction from instruction means, and sound based on the DTMF signal is generated by the sound generation means.

The invention is particularly advantageous since a DTMF signal can be generated from a credit card based on the telephone number stored in storage means as long as the credit card is effective.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

[First Embodiment]

Figure 1A:
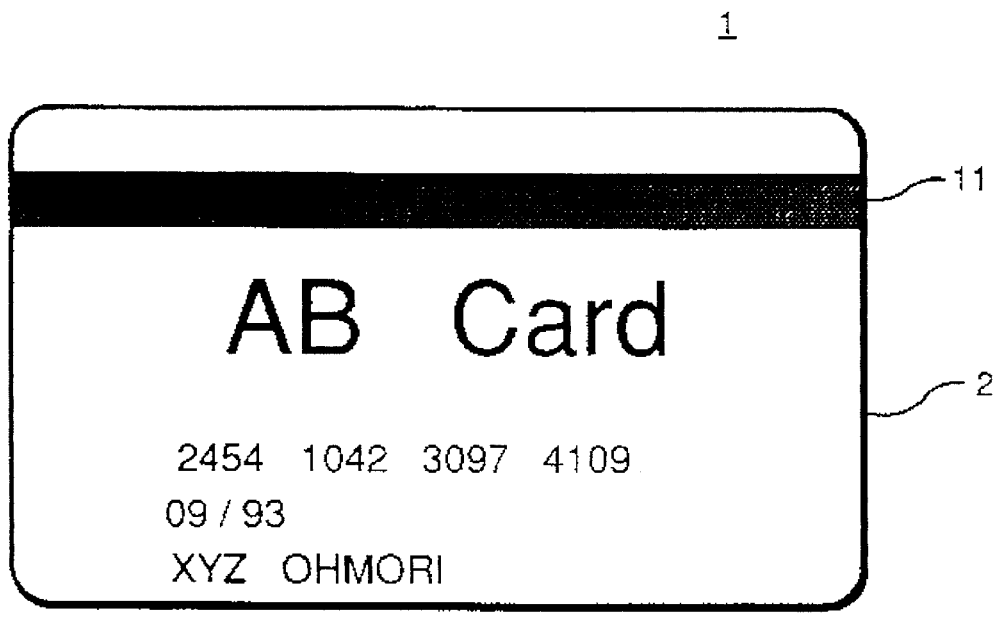
FIGS. 1A and 1B are diagrams showing the exterior of a credit card having a dial-tone signal generation function in accordance with the first embodiment of the invention.
Figure 1B:
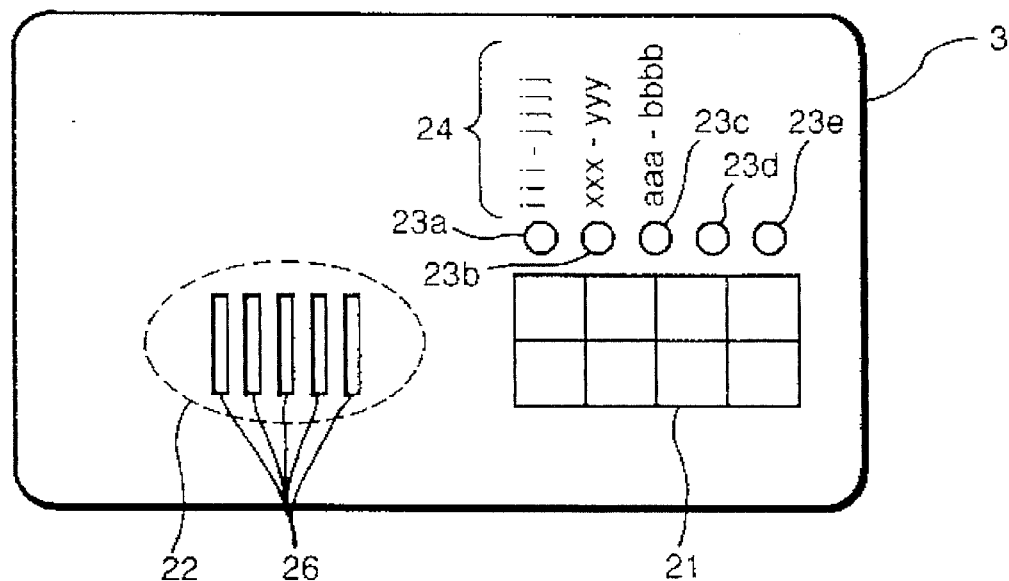

FIG. 1A and 1B show exterior views of a credit card 1 having a dial-tone signal generation function in accordance with the first embodiment of the invention (hereinafter, referred to as a "credit card"). FIG. 1A shows the face of the credit card, while FIG. 1B shows the reverse side. In FIGS. 1A and 1B, numeral 11 is a magnetic stripe, numeral 21 is a solar power generator (solar battery), and numeral 22 is a paper speaker which generates a dial tone based on the DTMF signal. Numerals 23a–23e are piezo-electric dial selection keys, numeral 24 is a telephone number and a designation name corresponding to the dial selection key, and numeral 26 are speaker holes.

The credit card 1 consists of a plastic board 2 which is the face of the credit card 1 and a plastic board 3, the reverse side. The plastic boards 2 and 3 are made of hard chloroethylene resin, and each thickness is approximately 0.4 mm. When both boards are adhered to each other, the thickness is approximately 0.8 mm, which is capable of being read by the ATM or card readers of POS terminals. Note that the credit card has some flexibility due to the material and thickness. The bonding agent in this embodiment has sufficient durability with respect to the stress generated by thermal expansion or thermal contraction on the adhering surface of the member (plastic boards 2 and 3). Furthermore, the bonding agent can be composed of special polymer including silyl as a main component so that the plastic boards 2 and 3 can be flexible to some degree and whose deterioration of adherence from secular change is at a minimum.

Figure 2:
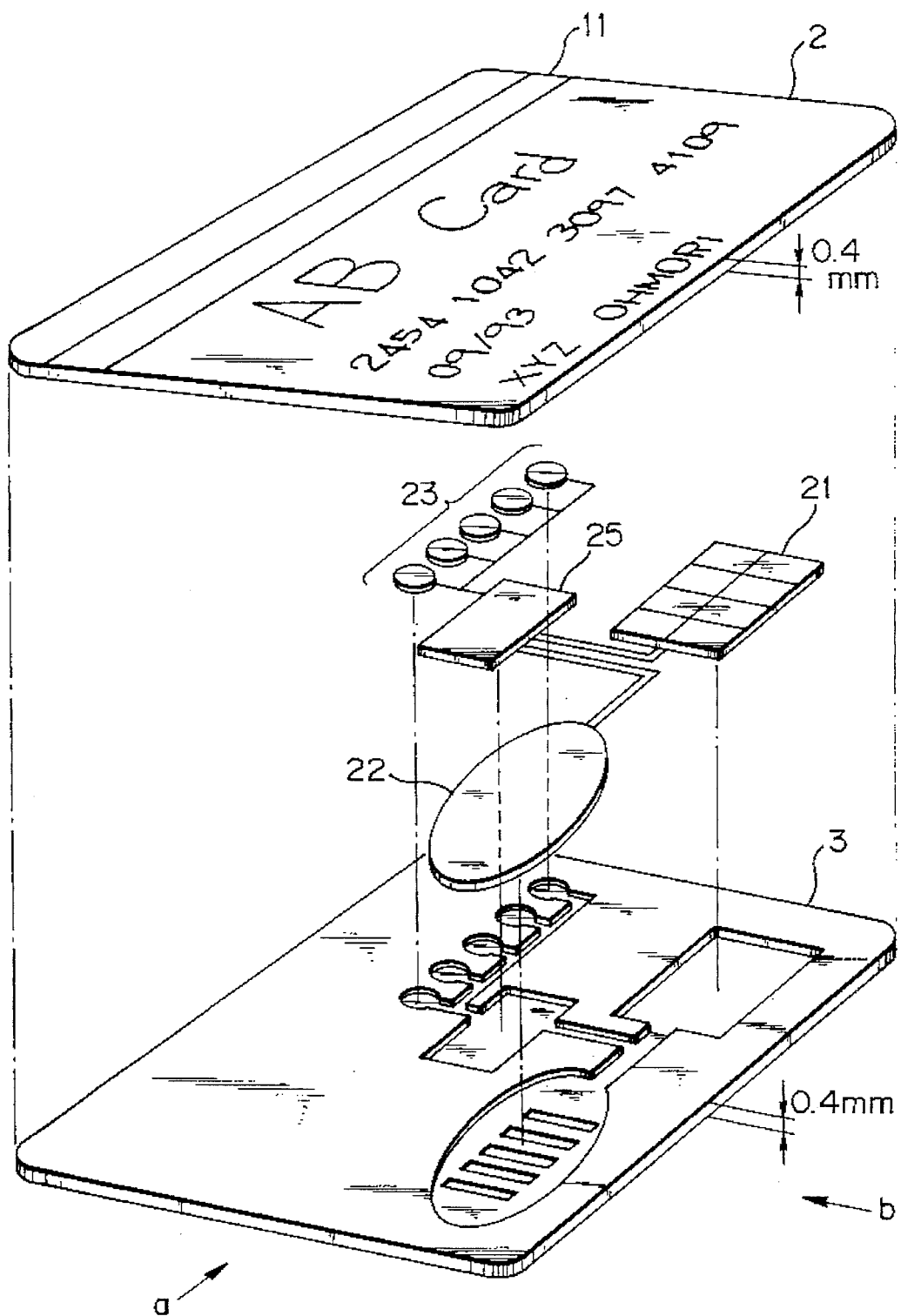
FIG. 2 is a three-dimensional exploded perspective view of the credit card in accordance with the first embodiment.

FIG. 2 is a three-dimensional exploded perspective view of the credit card 1. As shown in FIG. 2, a magnetic stripe 11 is adhered on the plastic board 2 where the title of credit card is printed and a name of credit card holder is embossed. The embossed characters are risen approximately 0.48 mm from the surface of the plastic board 2. In the plastic board 3, components required to execute a telephone-automatic-dialing function are laid. These components are a solar power generator (solar battery) 21, paper speaker (SP) 22, dial selection key 23 and circuit board 25 which includes a control circuit for generating a DTMF signal. Each component is connected to each other by leads laid in the plastic board 3.

Accordingly, each component is laid at the center of the plastic board 3 apart from the end of the plastic board 3, and provided in a single-layer structure to avoid the components from being overlaid on each other. Thus, the thickness of the plastic board 3 is minimized, and each element is protected from the impact from the direction indicated by "a" and "b". With respect to the impact from the direction which is perpendicular to "a" and "b", the plastic board 2 and the plastic board 3 serve as protection member.

Furthermore, by separating the position of the magnetic stripe 11 from the mounting position of the paper speaker 22, the magnetic influence generated by the paper speaker 22 on the magnetic stripe 11 is reduced.

Figure 3:
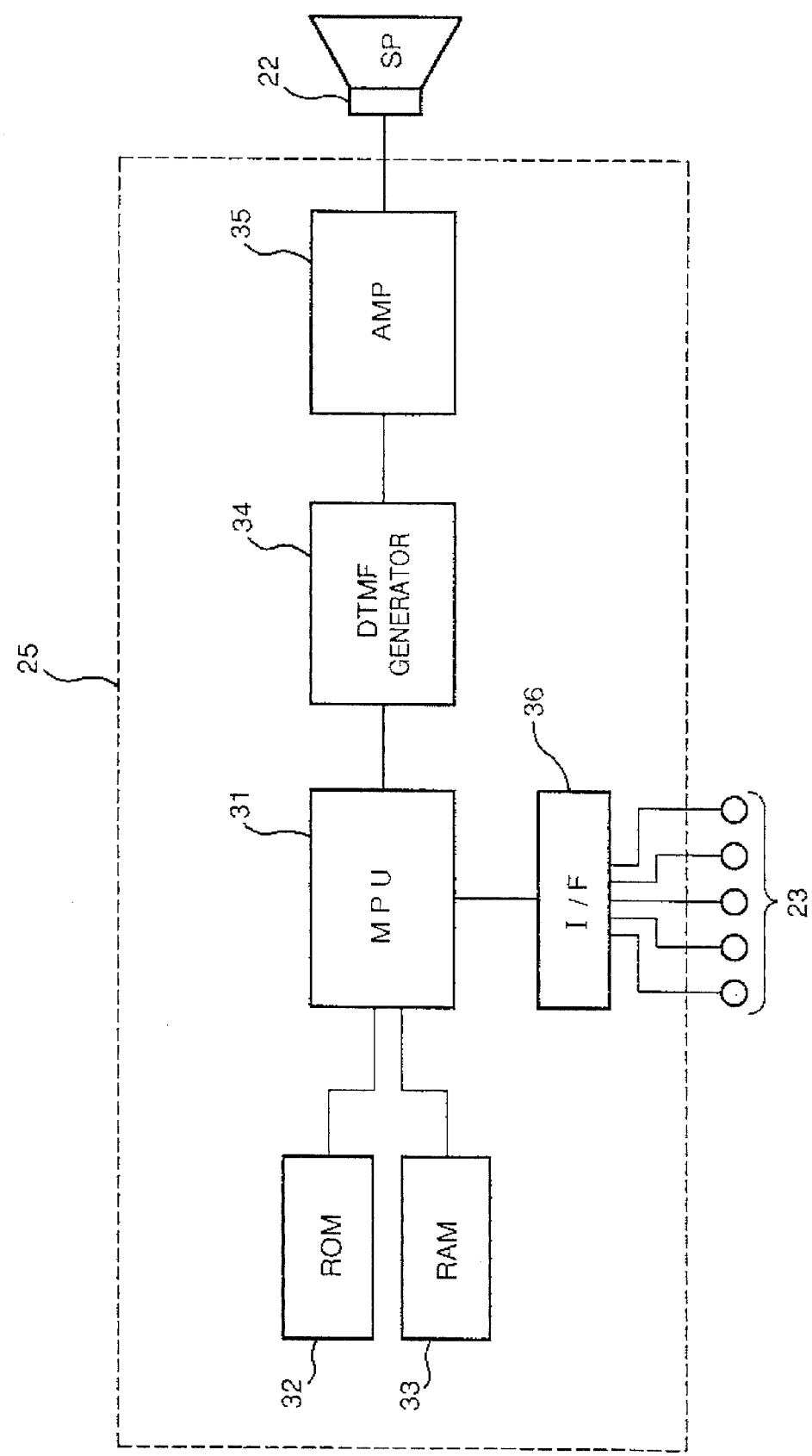
FIG. 3 is a block diagram illustrating the circuit construction to execute a dialing function in accordance with the first embodiment.

FIG. 3 is a block diagram illustrating the circuit construction to execute the dialing function of the telephone. In FIG. 3, numeral 31 is a one-chip MPU for controlling the entire apparatus, and numeral 32 is a ROM for storing the control program executed by the MPU 31 and telephone number to generate a DTMF signal. Numeral 33 is a RAM used as a work area to execute the control program, numeral 34 is a DTMF generator for generating the DTMF signal corresponding to the telephone number designated by the MPU 31, numeral 35 is an amplifier for amplifying the generated DTMF signal and outputting it to the paper speaker 22, and numeral 36 is an interface (I/F) for informing that the dial selection key 23 is pressed to the MPU 31. Furthermore, the circuit board 25 is mounted by components included in the area enclosed by dot line of FIG. 3.

The telephone number stored in the ROM 32 can be arbitrary, such as a number processed as an international call or the number of a company which offers a Japanese operating service in correspondence to the call from abroad. The telephone numbers stored in the ROM 32 are respectively corresponded to the dial selection keys 23a–23e.

By using the credit card with the above construction, for example, when an international call is made with the assistance by an operator, the face having the paper speaker 22 of the credit card 1 is directed to the mouth-piece of a handset, and a desired key in the dial selection keys 23a–23e is pressed.

Since the telephone numbers stored in the ROM 32 are respectively corresponded to the dial selection keys 23a–23e, the MPU 31 reads the telephone number allotted to the key input out of the ROM 32. Subsequently, the MPU 31 instructs the DTMF generator 34 so as to generate a DTMF signal corresponding to the telephone number. The DTMF signal generated by the DTMF generator 34 is then amplified by the amplifier 35, and transmitted to the mouth-piece of handset via the paper speaker 22.

According to the embodiment, even if the card holder cannot recall the necessary telephone number, the face having the paper speaker of the credit card is directed to the mouth-piece of the handset and a dial selection key is pressed, the DTMF signal corresponding to the key is generated and transmitted to the mouthpiece of the handset. Thus, a call is easily made. More particularly, if the telephone number of an international telephone company offering the Japanese-speaking operating service is registered, an international call is made from abroad easily, without going through troublesome process, and without using the language in a visiting country.

[Second Embodiment]

In the first embodiment, telephone numbers are stored in the ROM in advance, however, this does not impose a limitation upon the invention. For example, it can be arranged such that a desired telephone number can be stored by providing a liquid crystal display and ten key or push button. In this embodiment, the credit card which is constructed so as to store telephone numbers desired by the card user.

Note that the portions which are identical to these of the first embodiment have the same reference numerals, and the description is not repeated.

Figure 4:
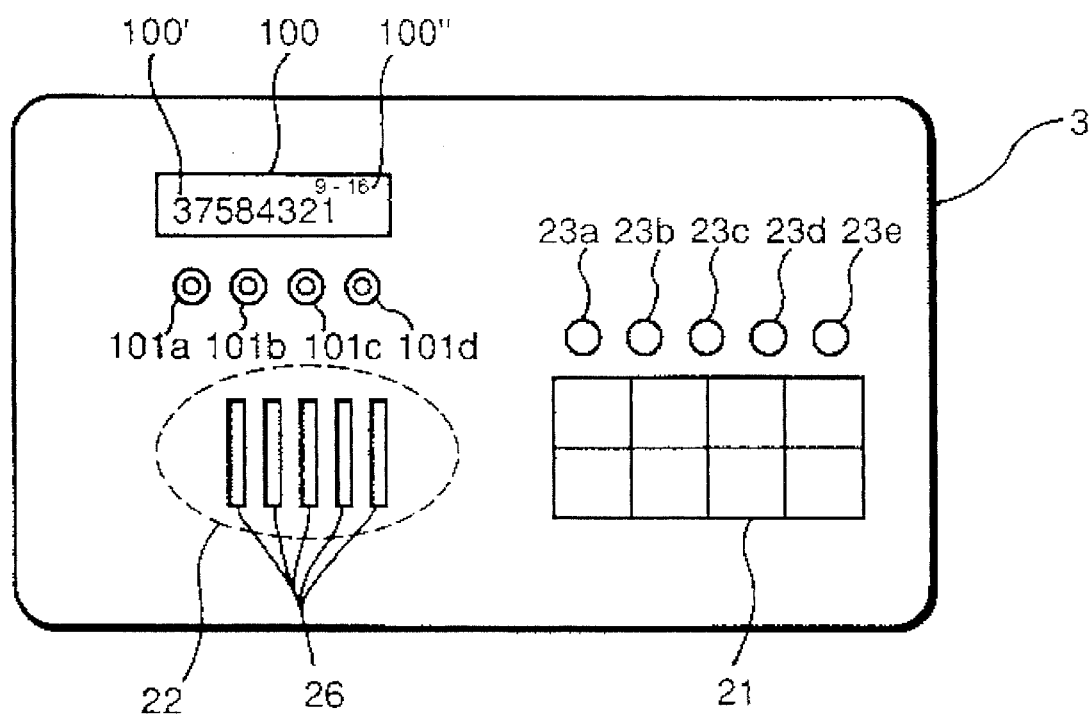
FIG. 4 is a diagram illustrating the rear view of the credit card having a dial-tone signal generation function in accordance with the second embodiment of the invention.

FIG. 4 is a diagram illustrating the reverse (rear) side of the credit card having the structure of inputting a telephone number in accordance with the second embodiment. In FIG. 4, numeral 100 is a LCD for displaying an inputted telephone number, numeral 101a is an input mode button for switching the credit card to a telephone number input mode, numeral 101b is a digit selection button for selecting a desired number from the digits 0–9, numeral 101c is a confirmation button for confirming the input telephone number, and numeral 101d is a shift button for instructing to shift of the number to be displayed on the LCD 100. Furthermore, numeral 100' is an example of a string of the display numbers, and numeral 100" is an indicator of display digit (column). The indicator 100" shows that a string of display numbers is 9 to 16 digits.

Taking into consideration that the credit card of the preset embodiment is used for a direct international call, all digits or a part of digits of the telephone numbers can be displayed by the LCD 100. Since the input mode button 101a, digit selection button 101b, confirmation button 101c and shift button 101d are not used but for the exception with the case where a telephone number is inputted, these buttons are laid in a depression of the rear surface of the credit card 1. In this way, it is avoided that these buttons are mistakenly pressed. Furthermore, each of the inside diameters of the buttons 101a–101e is within 5 to 6 mm. Accordingly, the tip of ball-point pen or tooth pick may be used to press the button. In the embodiment, when the shift button 101d is pressed once, the displayed digits are shifted in all digit positions. If the shift button 101d is pressed after the least significant digit is displayed, the eight-digit input telephone number is displayed from the most significant digit.

Figure 5:
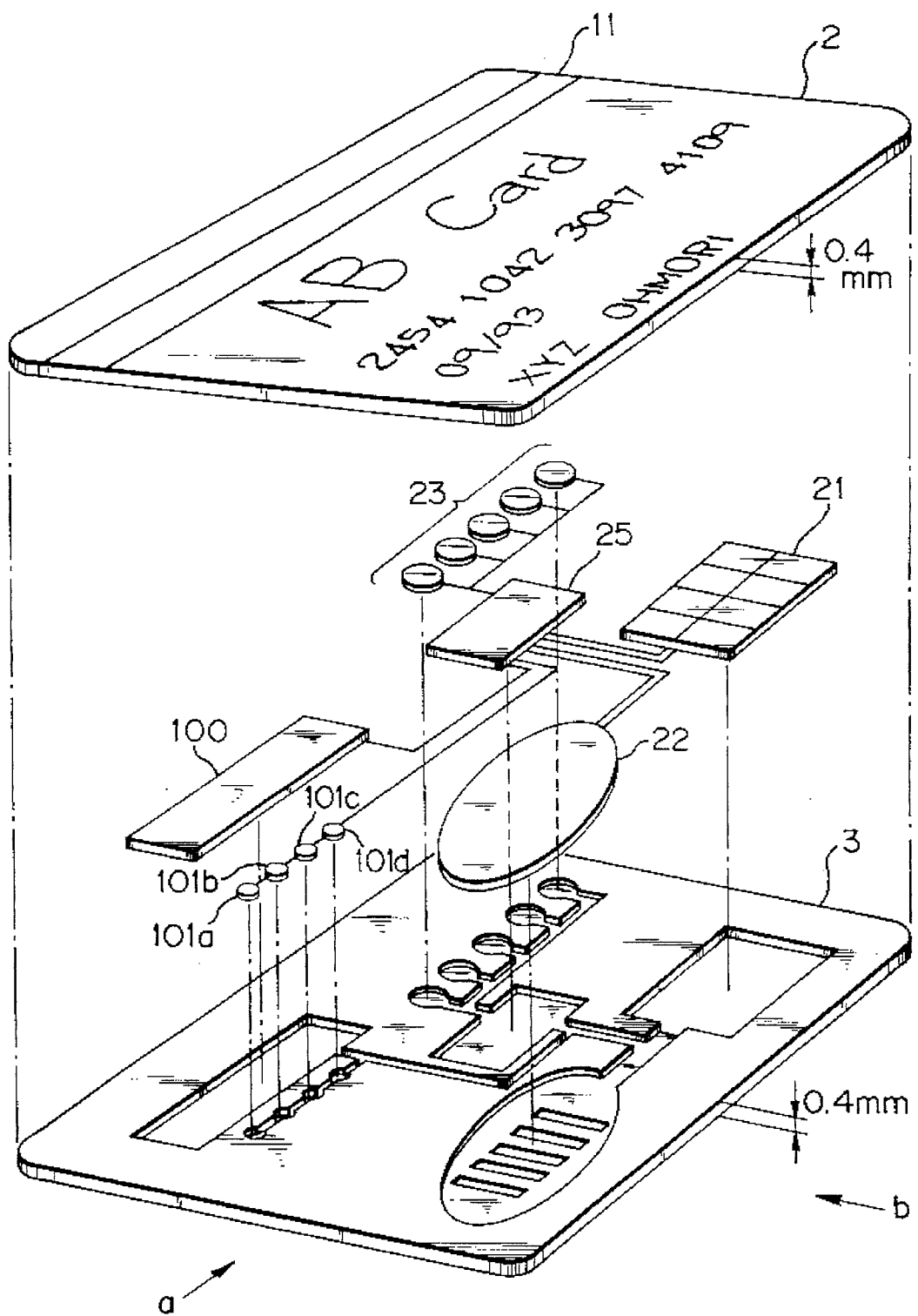
FIG. 5 is a three-dimensional exploded perspective view of the credit card in accordance with the second embodiment.

FIG. 5 is a three-dimensional perspective view of the credit card 1 in accordance with the embodiment. As shown in FIG. 5, the LCD 100, input mode button 101a, digit selection button 101b, confirmation button 101c and shift button 101d are laid in the plastic board 3.

Figure 6:
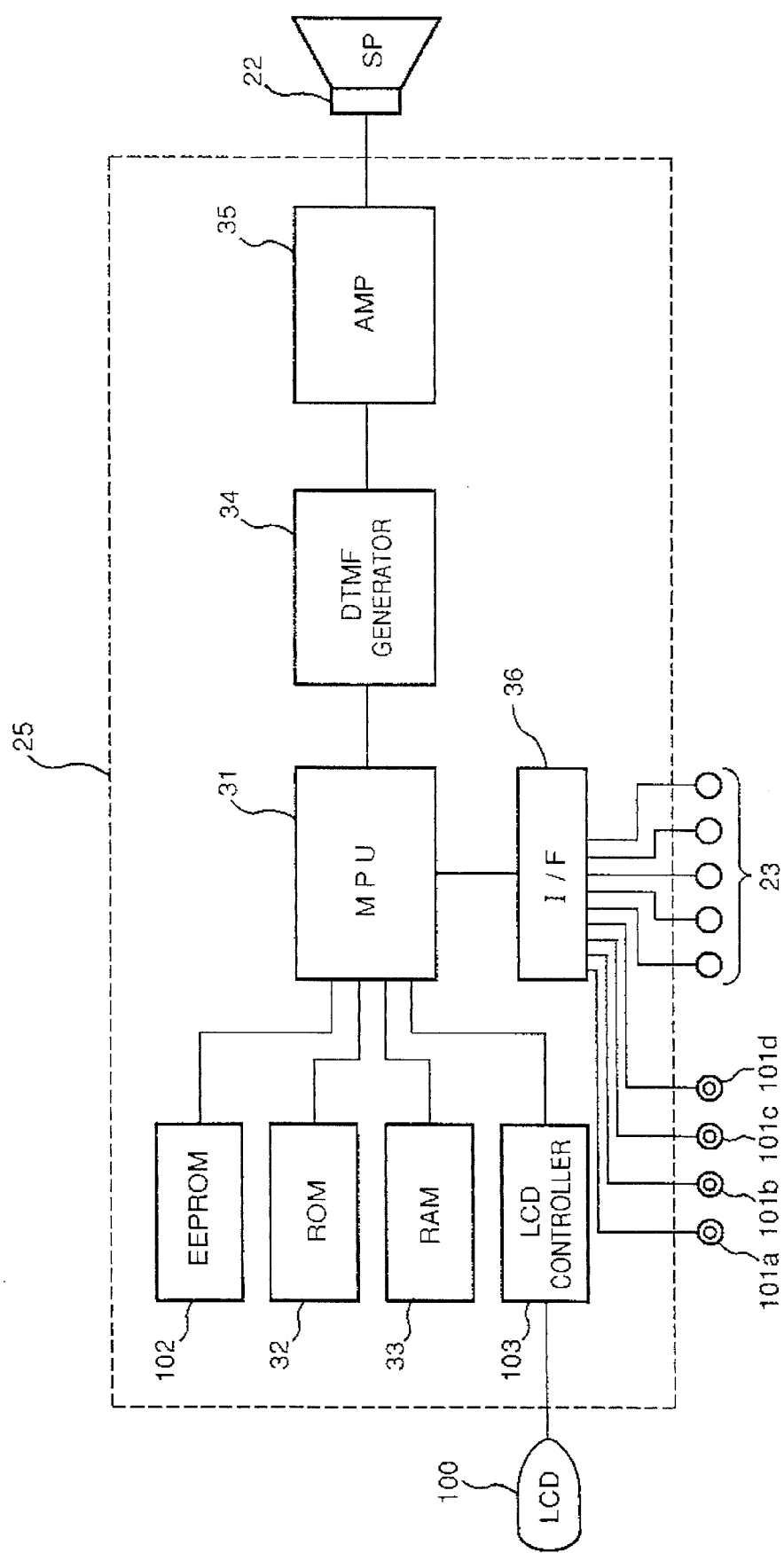
FIG. 6 is a block diagram illustrating the circuit construction to execute the dialing function in accordance with the second embodiment.

FIG. 6 is a block diagram illustrating the circuit construction to execute the input function of telephone numbers in accordance with the embodiment. In FIG. 6, numeral 102 is an EEPROM for storing information of inputted telephone numbers, numeral 103 is a LCD controller for controlling the display on the LCD 100. The information stored in the EEPROM 102 is rewritten in the MPU 31 in accordance with the inputted telephone numbers. Key interface (I/F) 36 is connected to the input mode button 101a, digit selection button 101b and confirmation button 101c. The instructions from these buttons 101a–101c are transmitted to the MPU 31 via the key interface (I/F) 36. Furthermore, the dial selection keys 23a–23e are allotted to the data storage address of the EEPROM 102. The telephone number corresponding to the address of the EEPROM 102 is read out, and a DTMF signal is generated based on the telephone number as similar to the first embodiment. While the DTMF signal is generated, the read-out telephone number is displayed for a predetermined period on the LCD 100. Thus, the input telephone number is confirmed. If the number of digits of the read-out telephone number is more than the that of digits capable of being displayed on the LCD 100, each eight-digits is displayed in predetermined intervals.

Furthermore, the ROM 32 stores a program for executing the telephone number input processing which is described below.

Figure 7:
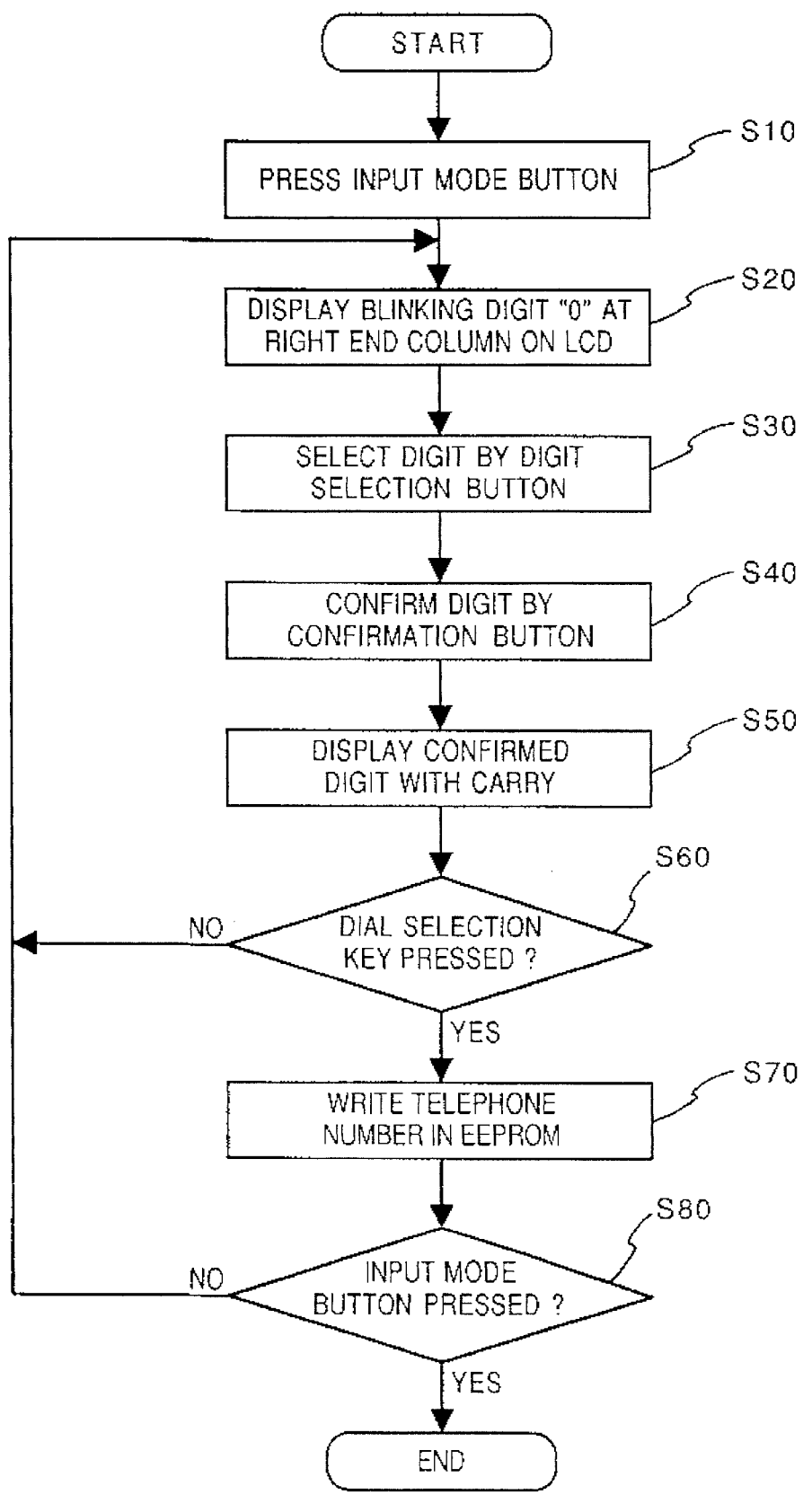
FIG. 7 is a flowchart indicating a telephone number input procedure in accordance with the second embodiment.

With reference to the flowchart of FIG. 7, the procedure for inputting telephone numbers, which is a feature of the embodiment in the credit card with the above construction, is described.

When the input mode button 101a is pressed at step S10, the credit card is set to the telephone number input mode, and at step S20, blinking "0" is displayed on the right most digit of the LCD 100.

At step S30, the digit selection button 101b is pressed to select an input number. If the digit selection button 101b is pressed once, the number of the blinking-display is increased by one. More particularly, when the number which is currently displayed is "0", if the digit selection button 101b is pressed once, the blinking-display number becomes "1". If the button 101b is pressed twice, "2" is displayed. Furthermore, when the blinking-display number reaches "9", if the button 101b is pressed again, "0" is displayed.

Accordingly, when a desired number is displayed on the LCD 100, the process proceeds to step S40 where a number is confirmed by pressing the confirmation button 101c. When the confirmation button 101c is pressed, the process proceeds to step S50 where the confirmed number is displayed with carry by one digit. For example, if the confirmed number does not exist so far, the currently confirmed number is displayed on the second digit from the right end of the LCD 100. Furthermore, if there are four confirmed numbers so far, each of the numbers is shifted by one digit to the left, and the currently confirmed number is displayed on the second digit from the right end of the LCD 100.

Subsequently, the process proceeds to step S60 where whether or not one of the dial selection keys 23a–23e is pressed is determined. If one of the keys is pressed, the telephone number input is completed, and it is determined that the pressed key is corresponded to the read-out key of the input telephone number, and then the process proceeds to step S70. At step S70, the input telephone number is written into the address of the EEPROM 102 corresponding to the dial selection key. On the contrary, if none of the keys is pressed, the process returns to step S20 where "0" is blinking-displayed at the right end of the LCD 100, and the telephone number input operation is repeated until the dial selection key is pressed.

Finally, at step S80, whether or not the input mode button 101a is again pressed is determined. If not, the process returns to step S20, while if pressed, the process is completed.

With the above processing, after the input mode button 101a is pressed, if the input mode button 101a is again pressed at an arbitrary timing, the telephone number input processing is completed. Furthermore, when "0" is blinking-displayed on the right end digit of the LCD 100, the confirmation button 101c is pressed without pressing the digit selection button 101b, the number "0" becomes a confirmed number.

According to the embodiment, a credit card user can store a desired telephone number, at most five, in the connection with the dial selection key in the EEPROM, and transmit a dial-tone signal based on the information.

In the embodiment, the dial selection key and four other buttons are used to input a telephone number, however, this does not impose a limitation upon the invention. For example, an up button so as to increment the display number by one or a down button so as to decrement the display number by one can be used to select a number. The shift button can be arranged such that the display digit can be shifted by one-by-one every time the shift button is pressed. Furthermore, the number of telephone numbers stored in the EEPROM is provided based on the number of dial selection keys, but it is not limited to five.

Furthermore, in the embodiment, the telephone numbers stored in the credit card are all registered by a user, however, this does not impose a limitation upon the invention. For example, in the combination with the first embodiment, it can be arranged that one or more than one telephone number is stored in the ROM in advance by the credit company.

In the first and second embodiments, the solar power generator (solar battery) is used as a power supply of the credit card, however, this does not impose a limitation upon the invention. For example, if it is considered that the function of the touch-tone signal generation needs to be operated in the term of credit validity (1–3 years), and the light-receiving surface of the solar battery is exposed to the outside and fragile to the shock from the outside, it can be arranged that a long-life battery such as a lithium battery can be embedded in the plastic board of the credit card. Accordingly, a shockproof circuit is improved and the reliability of the dial-tone signal generating function is increased.

Figure 8:
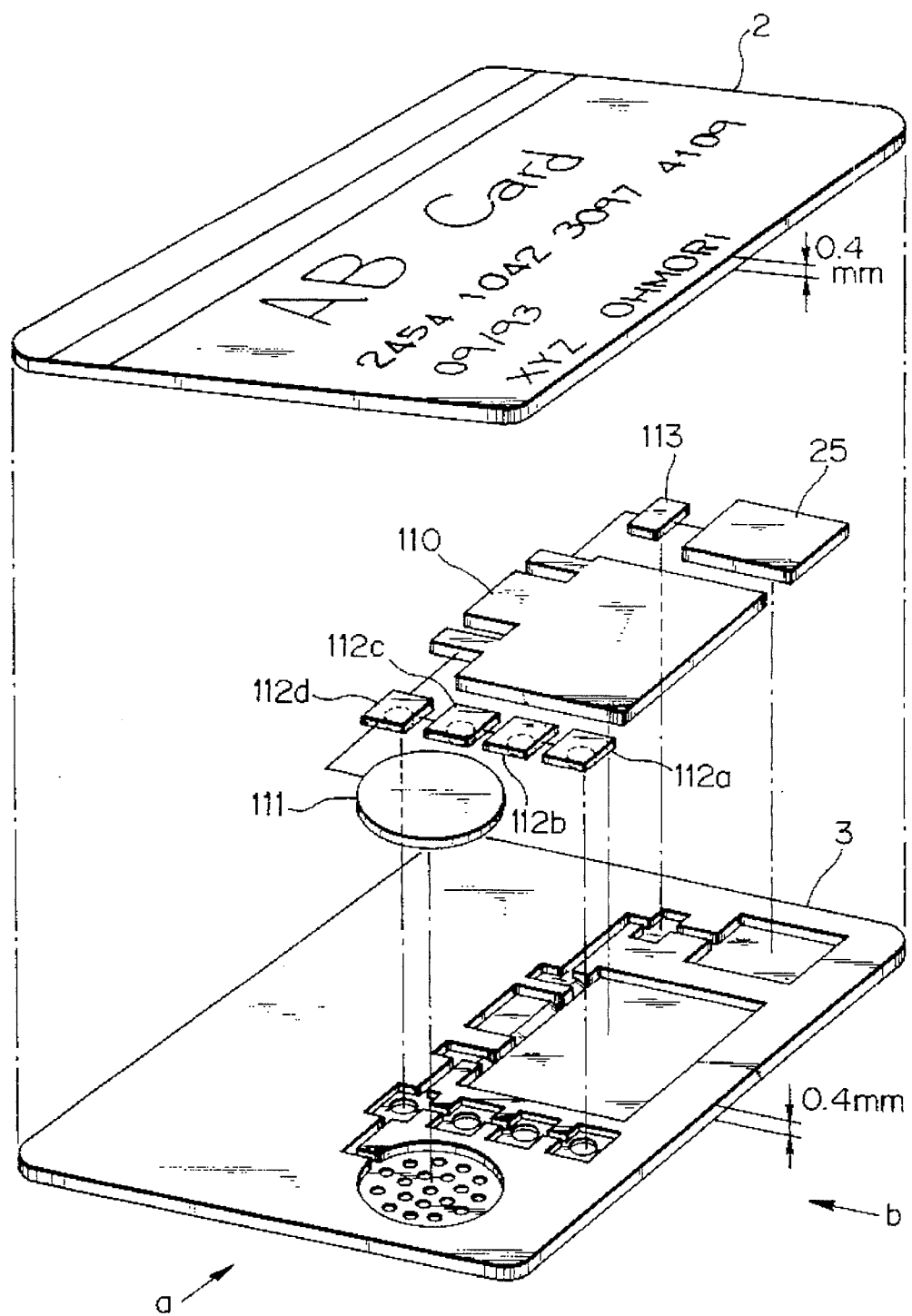
FIG. 8 is a three-dimensional exploded perspective view of the credit card perspective view of the credit card encapsulating a lithium battery.

FIG. 8 is a three-dimensional exploded perspective view of the credit card perspective view of the credit card encapsulating a lithium battery. In FIG. 8, numeral 110 is a lithium battery which can operate the circuit mounted on the credit card for approximately three years, if it is assumed that a DTMF signal is generated twice a day. Numeral 111 is a ceramic speaker, numerals 112a–112d are dial selection keys, and numeral 113 is a crystal oscillator for supplying a clock (Xtal). Furthermore, the lithium battery 110 has the shape of paper battery to be completely embedded in the plastic board, and the size is 29.3 mm (width)×22.5 mm (length)×0.5 mm (the maximum thickness). Furthermore, the life of the lithium battery and simplification of the circuit constitution of the credit card are considered, a switch for turning on and off the power supply from the lithium battery is not provided, and the power supply is started to the circuit at the time since the battery has been mounted on the card. Thus, the reliability of the circuit is improved by simplifying the circuit constitution without the switch.

The constitution shown in FIG. 8 does not include a mechanism of inputting a telephone number as described in the second embodiment. However, a credit card having such mechanism can be also constituted.

In the first and second embodiments, the paper speaker is used as a sound generator of the DTMF signal, and the piezo-electric key as a dial selection key, however, this does not impose a limitation upon the invention. For example, piezo-electric speaker or ceramic speaker, and electrostatic capacity type or dielectric-rubber key can be also used.

As many apparently widely different embodiments of the present invention can be made without departing from the spirit and scope thereof, it is to be understood that the invention is not limited to the specific embodiments thereof except as defined in the appended claims.

What is claimed is:

1. A credit card made of a thin plastic board, generating a DTMF tone as a dialer comprising:

a magnetic stripe for storing all necessary information required for the credit card function;

an engraved portion for engraving at least the credit card holder's name and the credit card number;

storage means for storing at least one telephone number;

selection means for selecting a telephone number from said at least one telephone number stored in said storage means;

DTMF signal generation means for generating a DTMF signal based on said selected telephone number by said selection means;

sound generation means for generating a DTMF tone based on said generated DTMF signal; and power supply means, imbedded in the thin plastic board, for supplying necessary power to said storage means, selection means, DTMF signal generation means and said sound generation means, wherein said magnetic stripe is provided on one side of said thin plastic board, said storage means and DTMF signal generation means are embedded in said thin plastic board, and said power supply means supplies necessary power, at least, during an effective period of said credit card, wherein a thickness of the credit card is practically equal to a thickness of a standard size credit card which is readable by a magnetic stripe reader normally used to read standard size credit cards.

2. The credit card according to claim 1, further comprising:

input means for inputting a desired telephone number; and display means for displaying the telephone number inputted by said input means or the telephone number stored in said storage means, wherein
    said display means is a LCD, and
    said input means and said LCD are provided on the same side as said selection means and sound generation means.

3. The credit card according to claim 2, wherein said input means includes:

an instruction button for instructing to set said credit card to an input mode for inputting telephone number;

display controlling means for controlling a displayed number on the LCD by the instruction from said instruction button;

a selection button for selecting a desired number by changing the number displayed on the LCD by said display controlling means; and a confirmation button for confirming the number selected by said selection button to store in said storage means.

4. The credit card according to claim 1, wherein said power supply means is a lithium battery embedded in the thin plastic board.

5. The credit card according to claim 1, wherein said sound generation means includes a speaker for outputting the DTMF tone, said speaker is located away from said magnetic stripe to reduce magnetic influence with respect to said magnetic stripe.

* * * * *